Aug. 7, 1962 R. M. AVERILL, JR 3,048,826

MAGNETIC MEMORY ARRAY

Filed Dec. 30, 1960 2 Sheets-Sheet 1

INVENTOR
R. M. AVERILL, JR.
BY William H. Kamstra
ATTORNEY

Aug. 7, 1962 R. M. AVERILL, JR 3,048,826

MAGNETIC MEMORY ARRAY

Filed Dec. 30, 1960 2 Sheets-Sheet 2

INVENTOR
R. M. AVERILL, JR.
BY
William H. Kaustha
ATTORNEY

United States Patent Office 3,048,826

Patented Aug. 7, 1962

3,048,826
MAGNETIC MEMORY ARRAY

Robert M. Averill, Jr., Murray Hill, N.J., assignor to Bell Telephone Laboratories, Incorporated, New York, N.Y., a corporation of New York Filed Dec. 30, 1960, Ser. No. 79,686
15 Claims. (Cl. 340—174)

Figure 1:
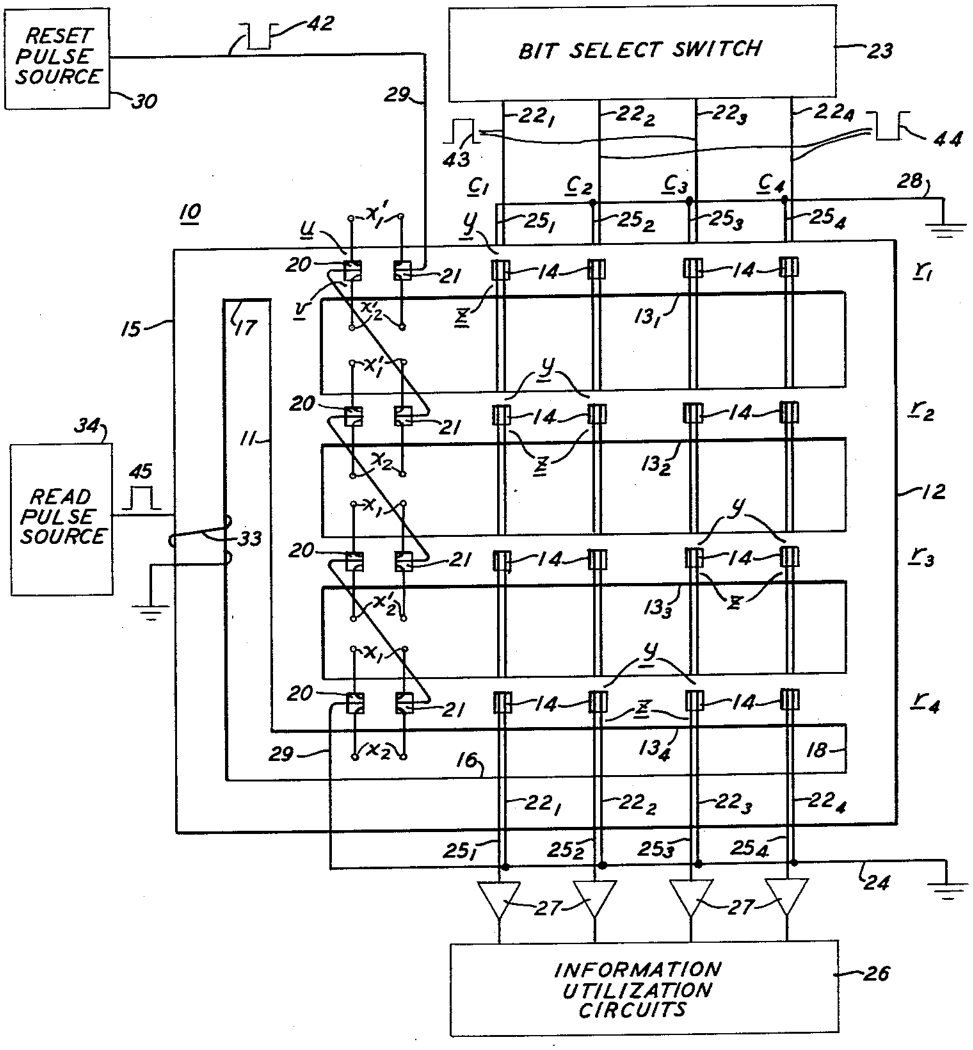

This invention relates to magnetic memory circuits, and more particularly to such circuits employing multi-apertured magnetic elements as the basic information storage addresses.

Coordinate memory arrays having individual magnetic information storage elements at the crosspoints of row and column access conductors have been extensively employed in information handling and data processing systems. Binary information bits are stored in the individual elements in the form of one or the other remanent magnetic state as is well known in the art. By means of coincident current access techniques, particular information addresses are selected in the memory array for writing into those addresses the binary bits which are to be stored therein. In one well known coordinate memory array having conventional square loop toroidal cores at the crosspoints, the row and column access conductors defining, in the array, the cores which are to contain the input binary bits, are each energized by half-select current pulses. A single half-select current pulse is in itself of insufficient magnitude to cause a complete flux excursion in a core from one remanent point on its loop to the other. However, as is also well known, the combined magnetomotive forces generated by two such half-select current pulses cause a complete flux switching in the core to which the forces are applied. The magnetic state to which the core is so driven is then representative of the binary bit to be stored therein. Two half-select current pulses thus coincide in time to cause a single complete flux switching in the single flux path toroidal core.

In another known memory arrangement described in Patent No. 2,912,677, November 10, 1959, of R. L. Ashenhurst et al., the toroidal cores are integrated in a single magnetic plate. The cores in this arrangement comprise the magnetic material immediately surrounding apertures formed in the plate. A memory array thus presented, although affording particular advantages, may be operated in the conventional manner by employing coincident current access techniques as generally described in the foregoing. Flux excursions and reorientations during write and read phases of operation are confined to the portions of the plate immediately surrounding the apertures which define the information bit addresses. Any linkages of flux between adjacent bit addresses in such an apertured plate arrangement would be detrimental to the optimum operation of the memory array and are specifically to be avoided.

Other multi-apertured magnetic elements have also been employed with particular advantages as the individual storage elements and memory arrays employing such elements have also become familiar in the prior art. Such elements present a plurality of flux paths in their structures and by appropriately steering flux through the various paths presented therein, an information storage and read-out function may be advantageously achieved. Such other arrangement is described, for example, in the copending application of U. F. Gianola, Serial No. 850,145, filed November 2, 1959. In such arrangements as there described a flux generated in particular paths or legs of the storage element coincidently with a current pulse applied to the element achieves the flux switching required to control the selective writing and reading of the binary bits stored in the element. Thus, although coincident currents are still required to generate the steered flux and provide other control functions to obtain access to particular storage elements of the coordinate array, the foregoing mode of access may for convenience be thought of as a coincident flux and current access operation. In such latter known multi-apertured arrangements each of the individual storage elements is separate and physically distinct from each of the others and is associated with adjacent elements only by connecting or common coupling conductors. Thus, flux changes in portions of one element in the optimum case have no direct effect on the magnetic state of its adjacent or other elements.

It is an object of the present invention to provide a new and novel magnetic memory array in which the individual magnetic storage elements are integrated in a single magnetic structure.

Another object of this invention is to achieve a read access to information addresses defined on an apertured magnetic plate by means of a drive flux steered to selected storage elements along flux paths connecting each of the storage elements of a memory array with each of the other elements of the array.

Still another object of this invention is to provide a magnetic memory array in which each of the individual storage elements are integrated in a single magnetic structure which array is more readily fabricated and presents a more simple geometry than heretofore known.

Yet another object of this invention is to increase the storage capacity and reduce the size of a coordinate magnetic memory array in which each of the individual storage elements is integrated in a single unified magnetic structure.

The foregoing and other objects of this invention are achieved in a memory arrangement employing a single integrated magnetic structure as the information storage element. An analogous integrated structure such as that employed in the present invention is described in the related copending application of E. E. Newhall, Serial No. 79,688, filed December 30, 1960. The magnetic structure of the present invention comprises a one-piece rectangular magnetic plate of a ferrite material having substantially rectangular hysteresis characteristics. The plate is apertured to present a coordinate array of individual magnetic storage addresses and presents a pair of side rails having a plurality of transverse cross legs integrally disposed therebetween. Adjacent one of the side rails of the plate and running substantially parallel therewith and also adjacent an end cross leg and also running substantially parallel with the latter leg, is an L-shaped flux drive leg. The L-shaped drive leg is integrally connected with the rectangular plate structure at diagonally opposite corners thereof. In the structure thus far described, it will be apparent that a plurality of flux paths are presented through the cross legs and connecting side rails which, when traced through the common L-shaped drive leg, are equal in length. The individual information bit storage elements are defined on the cross legs as the portions of the latter legs immediately surrounding a plurality of apertures in the cross legs. The information apertures are coordinately arranged in the plate structure thereby advantageously making possible access operations on a word-organized basis. The cross legs thus define the word rows and corresponding apertures defined on the cross legs then provide for the storage of the corresponding binary bits of the plurality of binary words stored in the memory array.

The representation of particular binary bits in a memory array according to the principles of this invention is conventional. That is, one of the bits is represented in an information address by a remanent magnetization around a bit aperture in one direction and the other of the bits is represented by a remanent magnetization around a bit aperture in the opposite direction. A new and novel method of writing the bits into the memory and reading the bits therefrom is employed in this invention however. Assuming a magnetic flux saturation state in one direction in a cross leg selected for writing purposes, including the minor legs formed by the information address apertures therein, a reset inductive means coupled to the selected cross leg is energized to drive the entire selected cross leg to an effectively neutral magnetic state. In this manner the minor legs formed by the bit apertures are driven to the threshold for switching, that is, only a small additional magnetomotive force is then required to cause either one or the other minor leg to switch.

It is a feature of this invention that such additional magnetomotive forces are supplied for each of the information address apertures simultaneously with the energization of the reset means. Bit select conductors threading corresponding apertures of the word rows are selectively energized by means of positive and negative bit select current pulses to cause one or the other minor leg defined by a bit aperture to switch while holding the other such minor leg. As a result, remanent magnetizations are induced around the bit apertures of a selected cross leg, which magnetizations will be in the directions as determined by the polarities of the bit select pulses and in accordance with the particular binary bits to be stored in the selected word row.

According to another feature of this invention, a read operation is accomplished by inducing a read drive flux through a selected cross leg. In view of the aforedescribed flux orientations around the bit apertures of the latter cross leg, it is clear that in each case one of the minor legs will be flux saturated in the direction of the read drive flux while the other minor leg will be free to switch responsive thereto. Such a flux switching in fact occurs during the read phase of operation and sensing conductors coupled to both of the minor legs of each information address are energized responsive to this flux switching to provide output signals indicative of the information bits stored in the interrogated word row. The polarities of the output signals are obviously determined by which of the minor legs of an information address is switched and which remains in its previous remanent magnetic state. After a read-out operation, a selected cross leg will be in the saturated magnetic state which makes possible its reselection for writing purposes as generally described in the foregoing. The selection of a cross leg for read-out purposes thus advantageously also accomplishes the selection of the same cross leg for writing purposes.

It is also a feature of this invention that the reset inductive means employed in cooperation with the bit select current pulses for writing particular binary bits in a selected word row is also employed to select a particular cross leg for read-out purposes. The reset inductive means comprises a plurality of windings threading an additional pair of flux control apertures provided in each of the cross legs. A reset winding is energized to drive the associated cross leg to an effectively neutral magnetic state as was generally described in the foregoing. This same magnetic state may also be advantageously employed to prevent the closure of a drive flux in the selected cross leg. This is accomplished in accordance with the principles of this invention by applying binary code address variable pulses to address windings also threading the flux control apertures. Particular address variables thus control the blocking of all except a selected one of the cross legs to the read drive flux during a read-out operation.

A memory array according to the principles of this invention is readily fabricated and offers the important advantages that in the case of the current pulses energizing the reset windings during a write phase or the address windings during a read phase, no upper limits on the magnitude of these currents is imposed. Similarly, no upper limit appears for the read current applied to the flux drive leg in which the read drive flux is initially induced during a read-out operation. On the other hand, since only a small magnetomotive force is required to upset the magnetic equilibrium of a selected cross leg and the minor legs defined thereon during a write operation, only bit select currents of relatively low magnitude are required for this purpose.

Figure 2A:
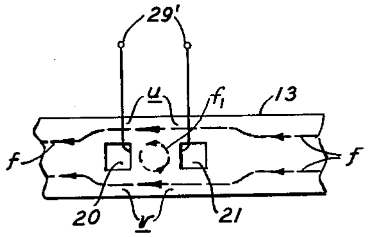
Figure 2B:
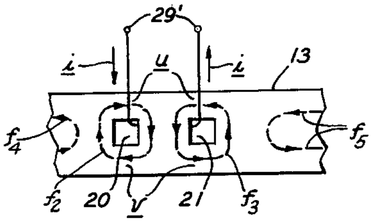
Figure 3A:
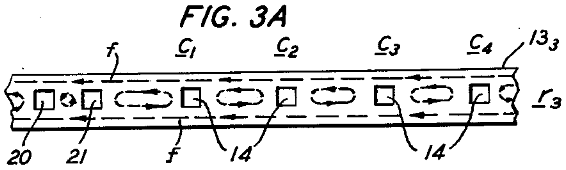
Figure 3B:
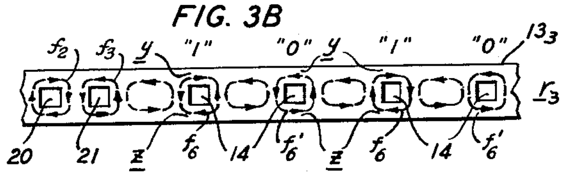

The foregoing and other objects and features of this invention will be better understood from a consideration of the detailed description of one specific illustrative embodiment thereof which follows when taken in conjunction with the accompanying drawing in which:

FIG. 1 depicts one specific illustrative memory array according to the principles of this invention showing the integrated memory structure in plan view;

FIGS. 2A and 2B each show a portion of a cross leg of the integrated magnetic structure of this invention for purposes of describing the novel flux gating means employed therein; and FIGS. 3A and 3B each show a portion of a cross leg of the magnetic structure of the memory array of FIG. 1 with the information storage addresses defined thereon for purposes of representing various magnetic states thereof during operative phases of this invention.

One illustrative embodiment of this invention is depicted in FIG. 1 and comprises a magnetic plate structure 10 apertured to present a plurality of flux steering legs in a substantially rectangular arrangement. The plate structure 10 is fabricated of any well known ferrite material exhibiting substantially rectangular hysteresis characteristics and is specifically apertured to present a pair of side rails 11 and 12 having a plurality of cross legs $\mathbf{13}_1$ through $\mathbf{13}_4$ transversely arranged therebetween. The cross legs 13 in turn are parallelly arranged and each of the cross legs 13 has a plurality of information bit apertures 14 therein. The portion of a cross leg 13 immediately surrounding a bit aperture 14 therein comprises an individual information storage address. Each bit aperture 14 in a cross leg 13 also divides the latter leg into a minor leg $y$ and a minor leg $z$ at each information storage address. Advantageously, the memory array of FIG. 1 is word organized, the storage address of a binary word being arranged in word rows along the cross legs, the binary bit addresses of the binary words being defined by the corresponding bit apertures 14 of the word rows. The rows and columns of information addresses are designated $r_1$ through $r_4$ and $c_1$ through $c_4$, respectively.

In addition to the legs described in the foregoing, the structure 10 has a flux drive section integral therewith comprising an L-shaped member made up of a drive leg 15 running parallel with the side rail 11 and a drive leg 16 running parallel with the cross leg $\mathbf{13}_4$. The drive legs 15 and 16 are connected at diagonally opposite corners of the rectangle formed of the side rails 11 and 12 and cross legs $\mathbf{13}_1$ and $\mathbf{13}_4$ by means of bridging legs 17 and 18, respectively. The elements and legs of the structure 10 are flux limited, that is, the minimum cross sectional areas of these elements are maintained in a specific dimensional relationship. Specifically, the minimum cross-sectional areas of the side rails 11 and 12, each of the cross legs 13, drive legs 16 and 15, and bridging legs 17 and 18, are substantially the same. The minimum cross-sectional area of each of the minor legs $y$ and $z$ of each of the cross legs 13 are also maintained substantially equal. The cross-sectional area of each of the major flux paths presented by the cross legs 13, for example, is also maintained at least equal to twice the cross-sectional area of a minor leg $y$ and $z$ defined thereon. Each of the cross legs 13 has a pair of small flux control apertures 20 and 21 therein located between the side rail 11 and the first column $c_1$ of storage elements. The flux control apertures 20 and 21 also divide the cross legs 13 at these points into minor flux legs $u$ and $v$, the cross-sectional areas of each of which is also equal to the cross-sectional area of a minor leg $y$ or $z$ of a cross leg 13.

Bit select column conductors $\mathbf{22}_1$ through $\mathbf{22}_4$ associated with the columns of information addresses $c_1$ through $c_4$, respectively, thread the apertures 14 and are inductively coupled to the minor legs $y$ and $z$ on either side of an aperture 14 in opposite senses. The conductors 22 are each connected at one end to a bit select switch 23 and at the other ends to a ground bus 24. Each of the bit apertures 14 of the cross legs 13 associated with the columns of information addresses has threaded therethrough a sensing conductor 25. The sensing conductors designated $25_1$ through $25_4$ in the drawing are also inductively coupled to the minor legs $y$ and $z$ of the cross legs 13 in opposite senses. The column sensing conductors 25 are each connected at one end to information utilization circuits 26 through a detection amplifier means 27 and at the other end to a ground bus 28. A reset conductor winding 29 is serially threaded in one direction through the aperture 21 and in the opposite direction through the aperture 20 of each of the cross legs 13 and is connected at the other end to the ground bus 24. The reset conductor winding 29 is connected at the other end to a reset pulse source 30. A read drive winding 33 inductively coupled to the drive leg 15 is connected between ground and a read pulse source 34.

In addition to the reset conductor winding 29, each of the aperture pairs 20 and 21 of the cross legs 13 has threaded therethrough in opposing directions a pair of address windings. Specifically, the apertures 20 and 21 of the cross leg $13_1$ have threaded therethrough the address windings $x_1'$ and $x_2'$, the apertures 20 and 21 of the cross leg $13_2$ have threaded therethrough the address windings designated $x_1'$ and $x_2$, the apertures 20 and 21 of the cross leg $13_3$ have threaded therethrough the address windings $x_1$ and $x_2'$, and the apertures 20 and 21 of the cross leg $13_4$ have threaded therethrough the address windings $x_1$ and $x_2$. Each of the address windings is connected to a pulse source for providing two-rail logic inputs not shown in the drawing for controlling flux steering in the structure 10 in a manner which will be described hereinafter. The address windings are thus shown in the drawing only as being provided with terminals to which appropriate pulses may be applied. Each of the pulse sources and the bit select switch referred to in the foregoing general description may comprise electrical circuitry well known in the art and each of these circuits is readily envisioned by one skilled in the magnetic switching art. Accordingly these circuits are shown in block symbol form in the drawing and are described only to the extent of describing the character of the pulses to be provided thereby. Similarly the detection amplifiers 27 may also comprise any suitable circuitry capable of raising output signals generated during the operation of this invention to levels required by the information handling system of which this invention may advantageously comprise a part. The information utilization circuits 26 may also comprise associated circuitry of such a system. Accordingly, these circuits are also shown generally in block symbol form since the details of these circuits are not considered essential to an understanding of the organization or practice of this invention.

A write-read cycle of operation of this invention is accomplished in two phases: a combined write-reset phase and a read phase. In a read phase a read drive flux is induced in the drive leg 15, which drive flux is completed via the drive leg 16, bridging leg 18, side rail 12, a selected one of the cross legs 13, side rail 11, and bridging leg 17. In the selected cross leg 13 the read drive flux is divided along the minor legs $y$ and $z$ at each of the bit apertures 14 therein, thereby causing flux switchings which will induce the output signals indicative of the binary bits stored in the selected word row as will be described in detail hereinafter. With such a read drive flux assumed to exist in a selected word row cross leg 13 an illustrative write-read cycle of operation of this invention may be described. However, before proceeding to such an illustrative cycle of operation, the precise manner in which flux orientations around the flux control apertures 20 and 21 exercise control over the possible flux closure paths of a read drive flux or the flux switchings around the apertures 14 during a write phase will be considered. In this connection, reference may be had to FIG. 2A where a portion of a cross leg 13 containing the flux control apertures 20 and 21 is shown.

The proper control of the flux orientations in the various legs and members of the structure 10 of this invention is determined by maintaining a limiting relationship between the minimum cross-sectional areas of those legs and members, as will become clear hereinafter. The portion of a cross leg 13 shown in FIG. 2A has threaded through the apertures 20 and 21 a single winding 29' which functions in the same manner and is intended to be representative of the reset winding 29 and the address windings $x_1$ and $x_2$ shown in the embodiment of FIG. 1. Considering now the magnetic states of the portion of a cross leg 13 shown in FIG. 2A, it is clear that a saturation flux, represented by the dashed lines $f$, entering at the right hand side of the cross leg 13 as viewed in the drawing, will divide on either side of the apertures 20 and 21 and pass along the cross leg via the minor legs $u$ and $v$ on either side of the latter apertures. The portion of the cross leg 13 lying between the apertures 20 and 21 in this case will be magnetically neutral as represented in the drawing by the closed flux loop designated $f_1$. For purposes of representing such a magnetically neutral condition, such a closed flux loop will be employed in the structure 10 whenever such a condition obtains during an operative phase of the memory circuit. The saturation flux designated $f$ thus shown as existing in the portion of the cross leg 13 depicted in FIG. 2A, which flux occurs during a read operation, may be assumed to find a closure path through other members of the plate structure 10 which path will be described in greater detail hereinafter.

In another magnetic flux situation in the cross leg 13, depicted in FIG. 2B, a positive current as represented by the arrows $i$ applied to the wind 29' induces a flux around each of the apertures 20 and 21 in the directions represented in the drawing by the closed flux loops $f_2$ and $f_3$, respectively, around those apertures. The portion of the cross leg 13 lying between the latter apertures will be maintained in a saturated state downward as long as the current is applied. The upper minor legs $u$ will remain saturated in a direction toward each other while the lower minor legs $v$ will remain saturated in a direction away from each other. As a result, the cross leg 13, in which a saturation flux previously existed as represented in FIG. 2A, will be reduced to an effectively neutral magnetic state as far as the magnetic effect on the operation of this invention is concerned. This follows, as will be appreciated by one skilled in the magnetic flux switching art, since the previous saturation flux will now be denied closure paths through the minor legs $u$ and $v$ on either side of the apertures 20 and 21. The minor legs $u$ and $v$ will be either already saturated or will be prevented from switching by the holding current applied to the winding 29' as is clear from FIG. 2B. The portion of the cross leg 13 lying between the apertures 20 and 21 will be similarly prevented from switching, and thereby providing a closure path, by the same current in the winding 29'. The neutral magnetic condition of the cross leg 13 at both sides of the apertures 20 and 21 is represented in FIG. 2B by the partial closed flux loops represented by the dashed lines $f_4$ and $f_5$ in accordance with the convention adopted in the foregoing. This neutral magnetic condition will be understood as continuing through the entire portion of the plate structure 10 which originally provided closure path for the saturation flux in the cross leg 13 represented in FIG. 2A.

At this point, in anticipation of an important flux control exercised during a write operation to be described hereinafter, it may be noted that, as the cross leg 13 is everywhere driven to a magnetically neutral state, any closed flux loop path presented therein, is driven to a threshold for switching. Thus, at such a closed flux loop a small additional magnetomotive force may be applied at one side thereof to hold the instant magnetic state and at the other side thereof to complete the flux switching. In this manner a remanent flux may be induced around an aperture, such as information bit aperture 14 in a cross leg 13. The magnetic equilibrium around such an aperture 14 during the application of a current to the winding 29' following a previously saturated state is upset by the additional magnetomotive force to drive the periphery of the aperture 14 to a remanent saturation state.

A saturation flux, such as a read flux to be described hereinafter, originally existing in the cross leg 13 and closure paths of the structure 10 may thus be understood as withdrawn from those paths by the current applied to the winding 29'. The foregoing flux reorientation operation will be referred to generally herein in describing an illustrative cycle of operation of this invention.

For purposes of describing an illustrative write-read cycle of operation of this invention it will be assumed that a read saturation flux was driven through the exemplary word row $r_3$ defined by the cross leg $\mathbf{13}_3$ in a previous read phase. It will further be assumed that the binary word 1, 0, 1, 0 is to be written into the exemplary word row. In this connection reference may be had to FIG. 3A where the selected cross leg $\mathbf{13}_3$ is shown broken away from the remainder of the plate 10. As previously mentioned, an assumed previous read phase leaves the cross leg $\mathbf{13}_3$ and the minor legs $u$ and $v$ and $y$ and $z$ defined thereon in which each of the closure paths for the read drive flux are remanently saturated in a right to left direction as viewed in the drawing. Since this saturated magnetic state is identical to that of the partial leg 13 described in connection with FIG. 2A, it is also symbolized in FIG. 3A by the dashed lines $f$. The neutral magnetic states are accordingly also represented by closed flux loops undesignated in FIG. 3A. As was also mentioned previously herein, the read drive flux is withdrawn and made available for a subsequent read operation by a reset, which reset also cooperates with bit select current pulses to accomplish the write operation. A negative reset current pulse 42, applied to the reset conductor winding 29 from the reset pulse source 30, causes a flux switching around the flux control apertures 20 and 21 in a manner identical to that described in connection with FIG. 2B. The resulting flux reorientations in the cross leg $\mathbf{13}_3$ are such that the continuity of the read drive flux symbolized in FIG. 3A is broken and each of the major and minor flux paths presented in the leg $\mathbf{13}_3$ are driven to an effectively neutral magnetic state. As previously mentioned, if now an additional magnetomotive force is applied to a closed flux path around an information bit aperture 14 on the cross leg $\mathbf{13}_3$, that closed flux path may be remanently saturated in either direction depending upon the direction of the applied force.

Such additional magnetomotive forces are applied in accordance with the principles of this invention by selectively applying bit select current pulses to the bit select conductors 22 simultanaeously with the reset current pulse 42 applied to the reset conductor winding 29. Thus, simultaneously with the reset current pulse 42, positive bit select current pulses 43 are applied to the bit select conductors 22 associated with the bit addresses of the word row $r_3$ which are to contain binary "1's" and negative bit select current pulses 44 are applied to the bit select conductors 22 associated with the bit addresses which are to contain binary "0's." In accordance with the exemplary binary word 1, 0, 1, 0, to be written into the word row $r_3$, a positive bit select pulse 43 is applied to each of the bit select conductors $\mathbf{22}_1$ and $\mathbf{22}_3$. Negative bit select current pulses 44 are applied to the bit select conductors $\mathbf{22}_2$ and $\mathbf{22}_4$. In each of the storage addresses of the cross leg $\mathbf{13}_3$ in which a binary "1" is to be stored, the positive bit select pulse 43 has the effect of preventing any change in the saturated state of the minor leg $z$ defined by the bit aperture 14 of such a storage address. At the same time, the positive bit select pulse 43 causes a flux switching in the minor leg $y$ of an information address which is to contain a binary "1." A remanent flux in the clockwise direction as viewed in the drawing is thus induced in each of the storage addresses thus driven, which clockwise flux is representative of a binary "1."

On the other hand, in each of the storage addresses of the selected cross leg $\mathbf{13}_3$ in which a binary "0" is to be stored, the negative bit select pulse 44 has the effect of preventing any change in the saturated state of the minor leg $y$ defined by the bit aperture 14 while at the same time causing a flux switching of the saturated state of the minor leg $z$. A counterclockwise flux as viewed in the drawing is thus induced in the storage addresses so driven in the cross leg $\mathbf{13}_3$, which counterclockwise flux is representative of a binary "0." The information representative flux states are symbolized in FIG. 3B by the dashed lines $f_6$ and $f_6'$, respectively, on a portion of the cross leg $\mathbf{13}_3$ there depicted. It will be appreciated that the portions of the cross leg $\mathbf{13}_3$ between the storage addresses are driven to magnetically neutral states as is also symbolized in FIG. 3B. The magnetic states around the apertures 20 and 21 are again shown as counter directed closed flux loops just as in FIG. 2B and are accordingly also designated $f_2$ and $f_3$, respectively. With the completion of the foregoing flux reorientations in the cross leg $\mathbf{13}_3$, the exemplary binary word 1, 0, 1, 0, is now stored in the word row $r_3$.

During the foregoing illustrative write operation, it will be apparent that the bit select current pulses 43 and 44 are also being applied to the storage addresses of the other word rows $r_1$, $r_2$, and $r_4$. However, the magnetic states representative of the information bits stored in the latter information addresses are left undisturbed during a write operation. Word selective access to the memory array of this invention is advantageously achieved in view of the important difference existing in the magnitude of the bit select current necessary to cause a flux switching around a bit aperture 14 in the presence of a cooperating reset drive and this magnitude when the bit select current could cause such a flux switching in the absence of the reset drive. Since in the former case, the magnitude of the bit select current is substantially less than in the latter case, a positive discrimination between selected and unselected word rows is achieved. Obviously, an upper limit exists for the magnitude of the bit select current pulses 43 and 44 in order to avoid destroying information in one word row while writing in another word row. It is also important to note at this point that repeated applications of the reset current pulse 42 alone to unselected word row cross legs 13 will not disturb the information representative states of the information addresses. Once the portion of the cross leg 13 to which the reset conductor winding 29 is coupled, is saturated, no further magnetic drive can be transmitted to the remainder of a cross leg 13.

It will be appreciated that, in the foregoing illustrative write operation, no word row selection step was required. Such a step is rendered unnecessary by the combined reset and bit selection operation. However, in this abbreviated mode of operation, a writing operation is accomplished in the word row which was interrogated during a previous read operation. Thus, the word row selection step is advantageously combined with the selection of a word row for reading purposes. Such an illustrative read operation may now be described.

Although any word row may be selected for readout, for purposes of illustration it will be assumed that the word row $r_3$ also chosen for an illustrative write operation, will now be interrogated. A read operation is initiated by the application of a positive read current pulse 45 from the read pulse source 34 to the read drive winding 33. As a result, a read drive flux is induced in the plate structure 10, this read drive flux being closed through a path which may be traced, in a direction in view of the sense of the read drive winding 33, along the drive leg 16, bridging leg 18, side rail 12, a selected one of the cross legs 13, side rail 11, and bridging leg 17. The selection of the particular cross leg 13 defining the word row to be interrogated is accomplished simultaneously with the application of the read current pulse 45 applied to the read drive winding 33. As was described in detail in connection with FIGS. 2A and 2B and the winding 29' there shown as representative of either an address winding or the reset winding conductor 29, an address selection current pulse may be applied to an address winding $x_1$ or $x_2$ coupled to a particular cross leg 13 to effectively block this cross leg to a flux attempting to find closure therethrough. The latter address windings are shown in detail in FIG. 1 and by the application of the proper binary variable pulses thereto, all save one of the cross legs $13_1$ through $13_4$ may be effectively blocked to the read drive flux being induced in the drive leg 15. In the address selection of this embodiment a two-rail logic is assumed; accordingly, for the binary variables $x_1$ and $x_2$, the complements $x_1'$ and $x_2'$, respectively, are also provided. In accordance with the assumed binary code as given below, in order to select the exemplary word row selected for this illustrative read operation being described, two-rail logic input pulses corresponding to the variables $x_1=0$ and $x_2=1$ are required. These pulses are applied simultaneously with the current pulse 45 applied to the read drive winding 33. Thus, it is evident that current pulses will in this manner be simultaneously applied to the address windings $x_1'$ and $x_2$ at this time with the result that the cross legs $13_1$, $13_2$, and $13_4$ will be blocked to the read drive flux. The cross leg $13_3$ is thus available as a closure path for the latter flux. The address code variables and the particular word row selected thereby are given in the following table:

| $x_1$ | $x_2$ | Word row |
|---|---|---|
| 1 | 1 | $r_1$ |
| 1 | 0 | $r_2$ |
| 0 | 1 | $r_3$ |
| 0 | 0 | $r_4$ |

The read drive flux induced in the drive leg 15 thus finds closure through the cross leg $13_3$ selected by the applied address code variables. As this read drive flux is driven through the selected cross leg $13_3$, flux switchings will occur in the minor legs $y$ and $z$ defined therein by the bit apertures 14 in directions which will accord with the binary information stored in the addresses defined on the cross leg $13_3$. Specifically, as may be demonstrated with reference to FIG. 3B, as the read drive flux is driven from the right as viewed in the drawing, at the first aperture 14 from the right, the read drive flux finds the minor leg $y$ at this point already flux saturated and closure through this path is accordingly denied. However, the minor leg $z$ may be switched and the read drive flux, in causing this switching, passes on to the next succeeding minor legs $y$ and $z$. At the latter legs, the leg $z$ is already saturated in the direction of the read drive flux and this path is accordingly denied to the drive flux. The minor leg $y$, however, may be switched and the read drive flux passes via the latter route in finding closure through the cross leg $13_3$. The flux switchings thus described for the first two information storage addresses encountered continue along the cross leg $13_3$ for each of the remaining storage addresses defined thereon. Switching paths are also provided at the minor legs $u$ and $v$ defined by the flux control apertures 20 and 21 since at this time no current pulses are being applied to the address windings $x_1$ or $x_2'$ or the reset conductor winding 29. Thus, in accordance with the exemplary binary word 1, 0, 1, 0, stored in the storage addresses of the word row $r_3$ being interrogated, flux switchings in the minor legs $y$, $z$, $y$, and $z$ of the storage addresses in the columns $c_1$, $c_2$, $c_3$, and $c_4$, respectively, occur. In each case the flux switching will be in the same direction, that is, from right to left as viewed in the drawing. By threading the sensing conductors 25 as depicted in FIG. 1, each of the conductors 25 is coupled to the minor legs $y$ and $z$ in opposite senses. Accordingly, signals of opposite polarity will be induced in the sensing conductors 25 for the two binary bits. Specifically, in the illustrative read operation being described, in view of the particular sense of coupling of the conductors 25 shown in FIG. 1, negative output signals indicative of the interrogated binary "1's" will be induced in the sensing conductors $25_1$ and $25_3$ and positive output signals indicative of the interrogated binary "0's" will be induced in the sensing conductors $25_2$ and $25_4$. These output signals, which are indicative of the exemplary binary word stored in the interrogated word row $r_3$, are transmitted via the detection amplifier means 27 to the information utilization circuits 26 for consideration by the system of which the memory array of this invention may comprise a part. The resulting magnetic state of a cross leg 13 after a read operation is that symbolized in FIG. 3A. This magnetic state is also the control which selects the cross leg $13_3$ for a subsequent write operation as described previously herein.

Although a four-by-four memory array was assumed and shown in the drawing, it is to be understood that memory arrays of a greater capacity may also be constructed in accordance with the principles of this invention and the particular embodiment shown has been chosen for illustrative purposes only. The number of turns of the various windings and the particular senses in which the windings are coupled to the associated legs of the structure 10 are shown as being respresentative only. Thus, in each case these may be determined as dictated by the physical requirements of the memory array to be constructed in the practice of this invention. Similarly, it will be appreciated that energizing current pulses of polarities other than those shown and described may be employed for the operation of this invention. As will be apparent from the geometry described for the memory structure 10 of this invention, the memory array advantageously lends itself to the ready fabrication of multiplane memory arrays in which a number of apertured plates 10 are stacked in a substantially congruent arrangement. In this manner the use of common drive and other windings becomes possible. The advantages of combinations of the structures 10 will readily present themselves to one skilled in the magnetic switching art. In the embodiment of this invention described herein, opposite conditions of remanent magnetizations around the bit apertures were assumed for purposes of description. However, it will be appreciated by one skilled in the art that a neutral magnetic condition could as well have been assigned as representative of one of the binary bits. In such a case the presence and absence of an output signal during readout would conventionally be indicative of the two binary bits, respectively.

In the foregoing description of this invention and its operation, certain conventions with respect to the flux reorientations and switching in the various legs of the structure 10 were adopted for purposes of description. The actual internal physics of the legs during a flux switching operation, to the extent that is presently known, will be appreciated as being considerably more complex. However, in a flux limited structure such as that described, the convention employed provides a consistent means for understanding the novel results obtained by this invention and is also sufficient for understanding the manner of its practice. Other schemes could as well have been employed to describe the flux reorientations during the operation of this invention. However, in view of the specific limitations imposed on the relative dimensions of the various legs and members of the structure 10 as set forth herein, discussions of the flux switchings in terms of assigned units or values of flux, for example, have been specifically avoided. One skilled in the magnetic switching art will be readily cognizant of the flux switching possible in the structure 10 in view of the dimensional limitations imposed thereon.

What has been thus described is considered to be only an illustrative embodiment of this invention. Accordingly various and numerous other arrangements may be devised by one skilled in the art without departing from the spirit and scope of this invention.

What is claimed is:

1. A magnetic memory array comprising a rectangular plate of a magnetic material having substantially rectangular hysteresis characteristics, said plate being apertured to present a pair of side rails having a plurality of transverse cross legs arranged therebetween, said cross legs having a plurality of coordinately arranged information bit apertures therein, said plate being further apertured to present a flux drive member, a plurality of closed flux loops being defined through said drive member and said plurality of cross legs; first inductive means coupled to a selected one of said plurality of cross legs for applying a drive field thereto to drive a flux in said last-mentioned cross leg to a threshold for flux switching, a plurality of second inductive means coupled to said selected cross leg at said bit apertures, respectively, for applying bit select fields of one or the other polarity to said selected cross leg simultaneously with said drive field to induce remanent magnetizations around said bit apertures in one and the other directions representative of particular binary information bits, third inductive means coupled to said flux drive member for subsequently inducing a read flux therethrough and through said selected cross leg for causing flux switchings in said last-mentioned cross leg at said bit apertures, and sensing means coupled to said selected cross leg at said bit apertures energized responsive to said flux switchings for generating output signals indicative of said particular information bits.

2. A magnetic memory array as claimed in claim 1 in which each of said plurality of second inductive means comprises a bit selected conductor coupled in one sense to one minor leg of said selected cross leg defined by a bit aperture and in the opposite sense to the other minor leg of said selected cross leg also defined by that bit aperture.

3. A magnetic memory array comprising a rectangular plate of a magnetic material having substantially rectangular hysteresis characteristics, said plate being apertured to present a pair of side rails having a plurality of transverse cross legs arranged therebetween, said cross legs having a plurality of coordinately arranged information bit apertures therein, said plate being further apertured to present a flux drive leg; a plurality of bit select conductors threading, respectively, corresponding bit apertures of said plurality of cross legs, inductive control means coupled to each of said plurality of cross legs for simultaneously and selectively controlling flux switchings in said cross legs, inductive drive means for inducing a read drive flux in said flux drive leg, and a plurality of sensing conductors threading, respectively, corresponding bit apertures of said plurality of cross legs.

4. A magnetic memory array as claimed in claim 3 in which said flux drive leg is integrally connected to said rectangular plate at opposite diagonal corners thereof.

5. A magnetic memory array as claimed in claim 3 in which said inductive control means comprises a reset conductor serially threading a first and a second flux control aperture in each of said plurality of cross legs and a pair of address selecting windings threading said first and second flux control apertures of each of said plurality of cross legs.

6. A magnetic memory array comprising a rectangular plate of a magnetic material having substantially rectangular hysteresis characteristics, said plate being apertured to present a plurality of major flux legs therein including a pair of side rails, a plurality of cross legs transversely arranged between said side rails, each of said cross legs having a plurality of information storage addresses defined thereon, each of said addresses comprising the portion of a cross leg immediately surrounding a bit aperture therein, each of said information addresses also having a pair of minor flux legs therein defined by said bit apertures, and a flux drive leg; a plurality of bit select conductors threading, respectively, corresponding bit apertures of said plurality of cross legs, each of said bit select conductors being coupled to one of said minor flux legs at an information address in one sense and to the of said minor flux legs in the opposite sense, inductive control means coupled to each of said plurality of cross legs for simultaneously and selectively controlling flux switchings in said cross legs, inductive drive means for inducing a read drive flux in said flux drive leg, and a plurality of sensing conductors threading, respectively, corresponding bit apertures of said plurality of cross legs, each of said sensing conductors being coupled to one of said minor flux legs at an information address in one sense and to the other of said minor flux legs in the opposite sense.

7. A magnetic memory array as claimed in claim 6 in which the minimum cross-sectional areas of said major flux legs are substantially the same and in which the minimum cross-sectional areas of said minor flux legs are also substantially the same, the minimum cross-sectional area of a major flux leg being at least equal to twice the minimum cross-sectional area of a minor flux leg.

8. A magnetic memory array as claimed in claim 7 in which each of said plurality of cross legs has a pair of flux control apertures therein and said inductive control means comprises address variable windings threading the pair of flux control apertures of each of said plurality of cross legs, said address variable windings being selectively energizable for selectively blocking said cross legs to a saturation flux, and a reset conductor winding serially threading the pairs of flux control apertures of said cross legs energizable for simultaneously blocking all of said cross legs to a saturation flux.

9. A magnetic memory array as claimed in claim 7 in which said flux drive leg is integrally connected with said rectangular plate at opposite diagonal corners thereof.

10. A magnetic memory array as claimed in claim 9 in which said flux drive leg comprises a portion thereof running parallel with one rail of said pair of side rails and another portion thereof running parallel with an end one of said plurality of cross legs.

11. A magnetic memory array comprising a rectangular plate of a magnetic material having substantially rectangular hysteresis characteristics, said plate being apertured to present a pair of side rails having a plurality of transverse cross legs arranged therebetween, said cross legs each having a plurality of bit apertures therein defining a plurality of information bit addresses thereon, said plate being further apertured to present a flux drive leg, one of said plurality of cross legs having a saturation flux longitudinally induced therein; write means comprising first inductive control means coupled to said one cross leg for driving said one cross leg to a magnetic threshold for flux switching, bit select means coupled to said one cross leg at particular bit addresses thereon for applying magnetomotive forces in one direction thereto augmenting said magnetic threshold for inducing remanent magnetizations around particular bit apertures representative of one binary bit, and other bit select means coupled to said one cross leg at other particular bit addresses thereon for applying magnetomotive forces in the other direction thereto augmenting said magnetic threshold for inducing remanent magnetizations around said other particular bit apertures representative of the other binary bit.

12. A magnetic memory array as claimed in claim 11 also comprising read means comprising means for inducing a read drive flux in said drive leg, second inductive control means coupled to each of said cross legs for maintaining each of said cross legs except said one cross leg at a magnetic threshold for flux switching during the induction of said drive flux, and output circuit means comprising a plurality of sensing conductors threading, respectively, the bit apertures of said one cross leg energized responsive to flux switchings in said bit addresses of said one cross leg for generating output signals indicative of said one and the other binary bits.

13. A magnetic memory array comprising a plurality of magnetic core means arranged in rows and columns, each of said core means having an aperture therein thereby to present a closed flux path therearound and each being capable of assuming a first and a second remanent magnetic state, magnetic cross leg means for magnetically connecting each of the rows of core means together, magnetic side rail means for magnetically connecting each end of each of said cross leg means, a plurality of bit select conductor means threading, respectively, the apertures of the core means of said columns, inductive means coupled to each of said cross leg means for simultaneously and selectively controlling flux changes in said cross leg means and thereby around said closed flux paths, drive means for inducing a drive flux in any one of said cross leg means, and a plurality of sensing conductor means threading, respectively, the apertures of the core means of said columns.

14. A magnetic memory array as claimed in claim 13 in which said drive means comprises a drive leg means magnetically connected at one end to one end of one of said side rail means and magnetically connected at the other end to the other end of the other side rail means.

15. A magnetic memory device comprising a one piece magnetic structure of a magnetic material having substantially rectangular hysteresis characteristics, said structure being apertured to present at least one address leg connected at each end to a flux drive leg by magnetic connecting means, said address leg having a plurality of apertures therein to define a plurality of pairs of minor flux legs, said address leg being remanently magnetized around said apertures and through said minor flux legs in directions representative of particular binary information bits, read means for inducing a read drive flux in said flux drive leg, and sensing conductors coupled to said minor flux legs energized responsive to flux switchings therein for generating output signals indicative of said particular binary information bits.

No references cited.